Feb. 17, 1970
BUNJIRO SAITO
3,496,387
CURRENT-TO-PULSE CONVERSION DEVICE
Filed Oct. 5, 1966
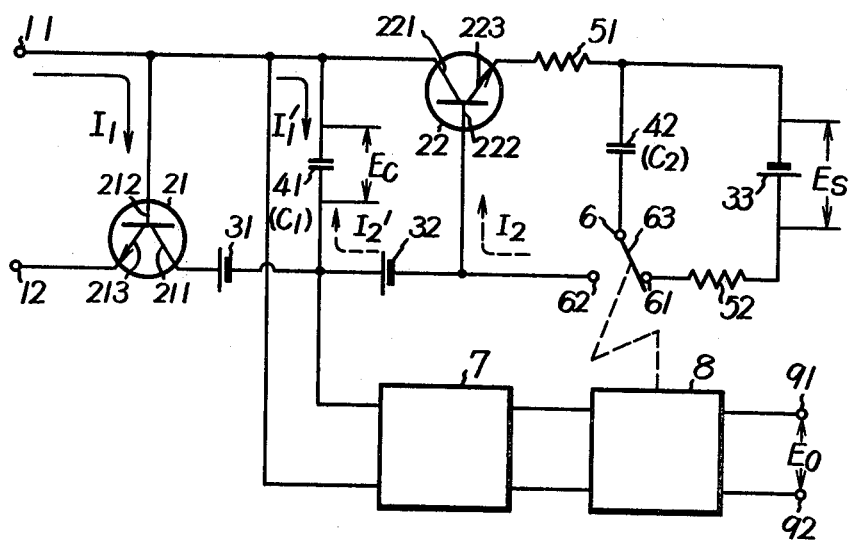
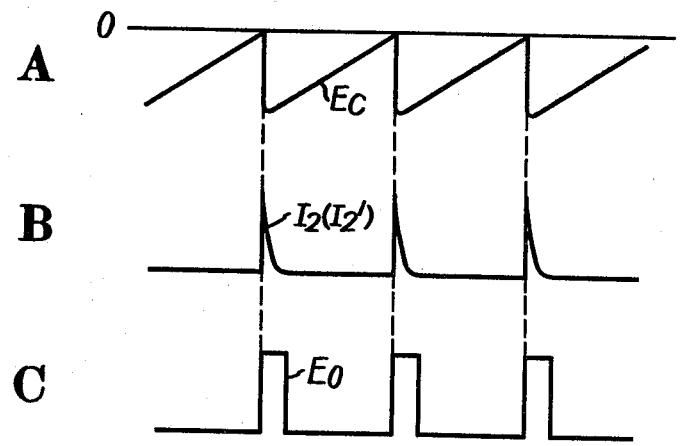
INVENTOR.
*Bunjiro Saito*
BY *Hill, Sherman, Meroni, Gross & Simpson*
ATTORNEYS United States Patent Office 3,496,387
Patented Feb. 17, 1970

3,496,387
CURRENT-TO-PULSE CONVERSION DEVICE
Bunjiro Saito, Tokyo, Japan, assignor to Kabushikikaisha Yokogawa Denki Seisakusho (Yokogawa Electric Works, Ltd.), Musashino-shi, Tokyo, Japan, a corporation of Japan
Filed Oct. 5, 1966, Ser. No. 584,549
Int. Cl. H03k 5/00
U.S. Cl. 307—260                    1 Claim

ABSTRACT OF THE DISCLOSURE

A current-to-pulse conversion device includes a first capacitor connected between the base and collector electrodes of a first transistor and charged in accordance with a DC input current passing through the first transistor, and a second capacitor connected through a change-over switch to a constant voltage power source and charged by the power source, and a second transistor having connected thereto the first capacitor and a series circuit of the second capacitor and the change-over switch. A voltage comparator circuit is operatively connected across the first capacitor for oscillation when the voltage across the first capacitor reaches a predetermined value and a monostable multivibrator circuit is connected to the output side of the voltage comparator circuit for actuation thereby to operate the change-over switch to effect a discharge of the first capacitor by the discharge current of the second capacitor.

This invention relates to a current-to-pulse conversion device, and more particularly to a current-to-pulse conversion device which converts an input current into a number of pulses corresponding thereto by making use of charging and discharging of an integrating capacitor for integrating the input current.

It is the primary object of this invention to provide a current-to-pulse conversion device which is capable of producing pulses exactly in proportion to an input current and is simple in structure but reliable in operation.

Other objects, features and advantages of this invention will become apparent from the following description taken in conjunction with the accompanying drawings, in which:

FIGURE 1 is a circuit diagram illustrating one example of a current-to-pulse inversion device of this invention; and FIGURE 2 illustrates waveforms for explaining the operation of the device shown in FIGURE 1.

With reference to the drawings one example of this invention will hereinafter be described in detail. In FIGURE 1 reference numerals 11 and 12 designate terminals for feeding an input current $I_1$, 21 and 22 constant-current transistors, 31, 32 and 33 DC power sources, 41 and 42 a first and a second capacitor, 51 and 52 resistors, and 6 a change-over switch. Reference numeral 7 indicates a voltage comparator circuit which oscillates when a voltage impressed to the input terminals becomes of a specified polarity, and this comparator circuit may be, for example, a blocking oscillator. Reference numeral 8 identifies a monostable multivibrator circuit which is actuated by the output pulse of the voltage comparator circuit 7, and reference numerals 91 and 92 represent output terminals. The base 212 and the emitter 213 of the transistor 21 are connected to the input terminals 11 and 12, while the collector 211 and the base 212 of the transistor 21 have incorporated therebetween a series circuit of the power source 31 and the first capacitor 41. Both electrodes of the first capacitor 41 are connected through the power source 32 to the base-collector circuit of the transistor 22. Between the base 222 and the emitter 223 of the transistor 22 there is connected a series circuit of the second capacitor 42 and a resistor 51 through a stationary contact 62 of the change-over switch 6. Both electrodes of the second capacitor 42 are connected to both ends of a series circuit of a resistor 52 and the power source 33 through the other stationary contact 61 of the change-over switch 6. Further, the output terminals 91 and 92 are connected to the both electrodes of the first capacitor 41 through the voltage comparator circuit 7 and the monostable multivibrator circuit 8.

Now, a description will be given in connection with the operation of the device constructed as above described. Suppose that the first capacitor 41 is held negative and that a movable contact 63 of the change-over switch 6 is held in contact with the stationary contact 61 so that the second capacitor 42 is charged by the power source 33. Under such circumstances, application of the DC current $I_1$ to the input terminals 11 and 12 produces in the base-collector circuit of the transistor 21 a DC current $I_1'$ equal to the current $I_1$ and having a polarity as indicated in the figure, charging the first capacitor 41. When the voltage $E_c$ across the capacitor 41 gradually rises toward zero and its polarity becomes positive the voltage comparator circuit 7 starts to oscillate. Upon oscillation of the voltage comparator circuit 7, the monostable multivibrator circuit 8 is actuated by the output pulse of the comparator circuit 7 to change-over the movable contact 63 of the change-over switch 6 to the stationary contact 62. Thus, the electric charge stored in the second capacitor 42 is discharged through the base-emitter circuit of the transistor 22 having connected thereto the resistor 51 and, as a result, a current $I_2'$ of an equal value to the discharged current $I_2$ flows through the collector-base circuit of the transistor 22, thereby discharging the charge stored in the first capacitor 41. In this case, the inversion time constant of the monostable multivibrator circuit 8 is selected to be such a value that the first capacitor 41 may be completely discharged by the second capacitor 42. Upon completion of discharging the first capacitor, the monostable multivibrator circuit 8 returns to its initial condition, the movable contact 63 of the change-over switch 6 moves into contact with the stationary contact 61 and the second capacitor 42 is again charged by the power source 33, while the first capacitor 41 is also charged again with the input current $I_1$. In this manner, these operations are repeatedly carried out. The variations in the voltage $E_c$ across the first capacitor 41 are depicted in FIGURE 2A and the relationship between the voltage $E_c$ and the discharge current $I_2(I_2')$ of the second capacitor 42 is illustrated in FIGURE 2B.

The quantity of electricity Q charged in the second capacitor 42 can be expressed by the following equation.

$$Q = C_2 E_s \quad (1)$$

where $C_2$ is the capacitance of the second capacitor 42 and $E_s$ is the output voltage of the power source 33. The voltage $E_c$ across the first capacitor 41 increases in proportion to the input current $I_1$ and immediately when the polarity of the voltage $E_c$ becomes positive the voltage comparator circuit 7 starts to oscillate. The monostable multivibrator circuit 8 is actuated by the output pulse of the voltage comparator circuit 7 to thereby discharge the second capacitor 42, which causes the first capacitor 41 to be discharged. Upon completion of discharging again with the input current $I_1$. Therefore, the period T of charging and discharging of the first capacitor can be given by the following Equation 2.

$$T = \frac{C_2 E_s}{I_1} \quad (2)$$

Accordingly, the pulse number P of the output voltage $E_o$ of the monostable multivibrator circuit 8 can be given by the following Equation 3.

$$P = \frac{I_1}{C_2 E_s} \quad (3)$$

That is, if only the capacitance $C_2$ of the second capacitor 42 and the output voltage $E_s$ of the power source 33 are made constant, the pulse number of the output voltage $E_o$ is proportional to the input current $I_1$ and is not adversely affected by the variations in the capacitance $C_1$ of the first capacitor 41 or by the variation in the oscillation start point of the voltage comparator circuit 8.

If a power source, which produces an output in proportion to, for example, the output pulse number P, is used as the power source 33, the pulse number of the output voltage $E_o$ becomes a voltage of the pulse number proportional to the square root of the input current $I_1$, so that the device of this invention can be utilized as, for example, a differential pressure flow meter or an integrating meter. Further, if a pulse current of a constant width and magnitude is fed as the input current, the voltage $E_c$ across the first capacitor 41 becomes proportional to the integrated value of the pulse current, and hence the device of this invention can be used as a counter. In addition, if the change-over switch 6 is constructed with an electrical element such as, for instance, a transistor, durability of the device is enhanced.

Among conventional types of current-to-pulse conversion devices, there is a device designed such that when discharging a capacitor for changing an input current the capacitor is shorted, but in such a device the input current is shorted at the same time during the shorting of the capacitor, producing errors correspondingly.

In the present invention, since the first capacitor for charging the input current is adapted to be discharged by the second capacitor having stored therein a certain quantity of electricity, the input current flowing to the first capacitor during discharging of the first capacitor is also integrated effectively. This ensures the production of a current-to-pulse conversion device which is highly precise but simple-structured.

It will be apparent that many modifications and variations may be effected without departing from the scope of the novel concepts of this invention.

What I claim is:

1. A current-to-pulse conversion device comprising a first transistor having a base, an emitter, and a collector, said base and emitter being adapted to receive a DC input current, a first capacitor connected between said base and said collector and charged in accordance with the input current passing through said base and said emitter of said first transistor, a second capacitor, a constant voltage power source, a change-over switch connected between said second capacitor and said constant voltage power source and operable to charge said second capacitor from said power source, a second transistor having a base, an emitter, and a collector, said first capacitor connected between said base and said emitter of said second transistor in series with said second capacitor and said changeover switch, a voltage comparator circuit having an input and an output, said input of said voltage comparator circuit connected across said first capacitor to effect oscillation of said comparator circuit when the voltage across said first capacitor reaches a predetermined value, and a monostable multivibrator circuit having an input and an output, said input of said multivibrator circuit connected to said output of said voltage comparator circuit to effect operation of said multivibrator circuit upon the operation of said voltage comparator circuit, said multivibrator circuit being further operably connected to said changeover switch and effective to operate said switch to establish a discharge of said first and second capacitors.

References Cited

UNITED STATES PATENTS

| | | | |
|---|---|---|---|
| 3,040,185 | 6/1962 | Horton | 307—275 |
| 3,051,851 | 8/1962 | Leonard | 307—273 X |
| 3,207,923 | 9/1965 | Prager | 307—260 X |

DONALD D. FORRER, Primary Examiner

R. C. WOODBRIDGE, Assistant Examiner

U.S. Cl. X.R.

307—246; 328—67, 151; 330—69

UNITED STATES PATENT OFFICE
CERTIFICATE OF CORRECTION

Patent No. 3,496,387            Dated February 17, 1970

Inventor(s) Bunjiro Saito

It is certified that error appears in the above-identified patent and that said Letters Patent are hereby corrected as shown below:

Column 2, lines 66 and 67 read as --Upon completion of discharging the first capacitor 41, the first capacitor is charged again with the input current $I_i$.--.

Signed and sealed this 23rd day of March 1971.

(SEAL)
Attest:

EDWARD M. FLETCHER, JR.
Attesting Officer

WILLIAM E. SCHUYLER, JR.
Commissioner of Patents